United States Patent [19]
DeMaria et al.

[11] Patent Number: 4,813,052
[45] Date of Patent: Mar. 14, 1989

[54] DIELECTRIC RIDGE WAVEGUIDE GAS LASER APPARATUS

[75] Inventors: Anthony J. DeMaria, West Hartford, Conn.; William Bridges, Pasadena, Calif.

[73] Assignee: The United States of America as represented by the Secretary of the Air Force, Washington, D.C.

[21] Appl. No.: 137,541

[22] Filed: Dec. 23, 1987

[51] Int. Cl.$^4$ ................................................ H01S 3/03
[52] U.S. Cl. .......................................... 372/64; 372/96; 372/61
[58] Field of Search ..................... 372/64, 61, 48, 96

[56] References Cited

U.S. PATENT DOCUMENTS

| | | | |
|---|---|---|---|
| 3,747,015 | 7/1973 | Buczek | 331/94.5 |
| 3,884,549 | 5/1975 | Wang et al. | 372/96 |
| 3,898,585 | 8/1975 | Heidrich et al. | 372/64 |
| 3,939,439 | 2/1976 | Fletcher et al. | 331/94.5 C |
| 4,429,398 | 1/1984 | Chenausky et al. | 372/64 |
| 4,688,228 | 8/1987 | Newman et al. | 372/64 |

Primary Examiner—Léon Scott, Jr.
Attorney, Agent, or Firm—William Stepanishen; Donald J. Singer

[57] ABSTRACT

A waveguide gas laser having a ridged dielectric substrate to form a gas filled region in which an electric discharge generates a lasing mode. These ridged waveguide configurations may be utilized in either a rectangular or circular guide structure.

19 Claims, 4 Drawing Sheets

DIELECTRIC RIDGE WAVEGUIDE GAS LASER APPARATUS

STATEMENT OF GOVERNMENT INTEREST

The invention described herein may be manufactured and used by or for the Government for governmental purposes without the payment of any royalty thereon.

BACKGROUND OF THE INVENTION

The state of the art of waveguide gas lasers is well represented and alleviated to some degree by the prior art apparatus and approaches which are contained in the following U.S. patents:

U.S. Pat. No. 3,747,015 issued to Buczek on July 17, 1973;

U.S. Pat. No. 3,939,439 issued to Fletcher et al on Feb. 17, 1976;

U.S. Pat. No. 4,429,398 issued to Chenausky et al on 31 January 31, 1984; and

U.S. Pat. No. 4,367,554 issued to Schlossberg on Jan. 4, 1983.

The Buczek patent discloses a gas laser rectangular waveguide having electric discharge plasma with the electric field oriented transversely with respect to the flow of gases therethrough is provided with a graduated magnetic field which is oriented transversely with respect to both the flow and the electric field to overcome the forces of flowing gases thereon. The plasma stabilizes at a point where the magnetic field force equals the force of the gas flow.

The Fletcher et al patent relates to a laser waveguide wherein corrugations or ridges are incorporated transverse to the length of the rectangular waveguide for amplifying the waves travelling through in the diffused regions.

The Chenausky et al patent discloses an RF-discharge waveguide laser incorporating two or more waveguides sharing a common set of discharge electrodes. The device may be used to provide two lasers operating on the same or different frequencies, or a single laser with two waveguides contributing to the power output.

The Schlossberg patent discloses a high pressure, high power, compact laser fabricated from a block of material which is highly transparent at the wavelength of operation. The transmitting block contains a multiplicity of channels along the longitudinal axes thereof, each channel being of such a minute cross-section that a laser medium located within each channel is incapable of independently sustaining a lasing action in a waveguide mode of operation.

SUMMARY OF THE INVENTION

The present invention utilizes a dielectric ridge waveguide gas laser. In the first embodiment, a rectangular waveguide has a plurality of periodically spaced metal electrodes on its upper and lower exterior surfaces. The upper and lower interior surfaces of the rectangular waveguide comprises a dielectric having a plurality of ridges which extend along the longitudinal axis of the waveguide. The plurality of ridges are spaced periodically and are in alignment with the exterior electrode stripe. In a second embodiment of the invention, the longitudinal ridges are formed around the interior peripheral surface of the tubular waveguide. Both embodiments are designed to permit an optical mode to exist within the ridges. Thus, the apparatus can be used to couple the evanescent component of the optical mode to an adjacent optical mode in a adjacent ridge guide. This coupling will provide a phase locking mechanism for adjacent waveguide lasers which in turn may have high power applications.

It is one object of the present invention, therefore, to provide an improved dielectric ridge waveguide gas laser apparatus.

It is another object of the invention to provide an improved dielectric ridge waveguide gas laser apparatus having a plurality of equally spaced ridge channels extending along the longitudinal axis of the waveguide.

It is still another object of the invention to provide an improved dielectric ridge waveguide gas laser apparatus having a double ridge waveguide configuration.

It is a further object of the invention to provide an improved dielectric ridge waveguide gas laser apparatus having a single ridge waveguide configuration.

It is an even further object of the invention to provide an improved dielectric ridge waveguide gas laser apparatus having multiple ridge waveguides arranged in a cylindrical configuration.

It is yet another object of the invention to provide an improved dielectric ridge waveguide gas laser apparatus wherein the ridge waveguide configuration is used to couple the evanescent portion of optical modes together.

These and other advantages, objects and features of the invention will become more apparent after considering the following description taken in conjunction with the illustrative embodiment in the accompanying drawings.

BRIEF DESCRIPTION OF THE DRAWINGS

FIG. 1b is a graphical representation of the near field intensity of the multiple ridge waveguides of FIG. 1a;

FIG. 2b is a graphical representation of the near field intensity in the single ridge waveguide of FIG. 2a;

DESCRIPTION OF THE PREFERRED EMBODIMENT

Figure 1A:
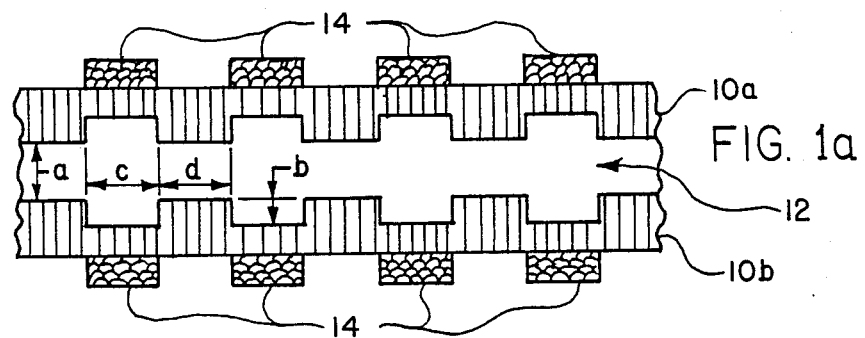
FIG. 1a is a cross-sectional view of multiple dielectric ridge waveguides laser apparatus transverse to the direction of light transmission.

Referring now to FIG. 1, there is shown in FIG. 1a a cross-sectional view of a multiple ridge waveguide gas laser apparatus. The waveguide gas laser apparatus comprises an upper and lower dielectric material 10a, b with a plurality of ridges. The ridges are defined by the dimensions, a through d, which are respectively defined as follows:

1. a equals the distance between the corresponding ridges of the upper and lower dielectric material 10a, b;
2. b represents the height of the ridge;
3. c represents the distance between adjacent ridges;
4. d represents the width of the ridge.

The region between the upper and lower dielectric waveguide portions 10a, b comprises a gas-filled region 12. The gas-filled region 12 may contain $N_2$:$CO_2$:He gas. Metal electrodes strips 14 are placed on the outer surfaces of the upper and lower dielectric waveguide portions 10a, b in alignment with the grooved portion of the waveguide that is between the ridges. Both the electrodes strips 14 and the ridges run along the longitudinal (i.e., into the paper and in the direction of the light flow) axis of the waveguide.

Figure 1B:
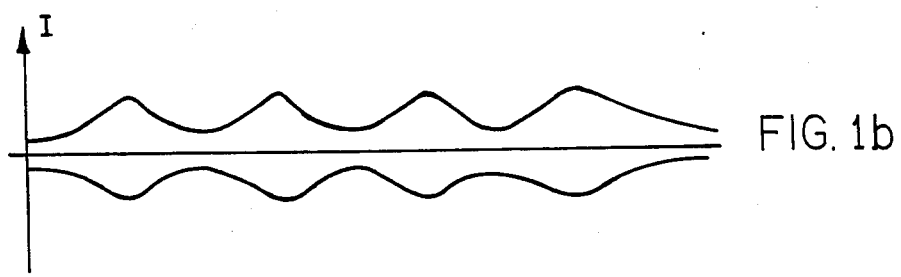

It was known that a mode does exist in a similar metal waveguide structure at microwave frequencies. Evanescent waves of the mode extend from the "c" region into the "d" region and consequently the waveguide gas laser apparatus of FIG. 1a can be used to couple the evanescent portion of one mode from on ridged waveguide to an adjacent mode in an adjacent ridged waveguide. This coupling will provide a phase locking mechanism for adjacent waveguide lasers which will coherently sum the output power of all the lasers and thus find medical, industrial and military applications where higher power, compact, and rugged lasers are required. There is shown in FIG. 1b a graphical representation of the near field intensity for an optical signal in the double ridge waveguide gas laser apparatus as shown in FIG. 1a. The far field of multiple phased locked lasers corresponds to the theoretical minimum spot size associated with the dimension of the phased locked laser aperture.

Figure 2A:
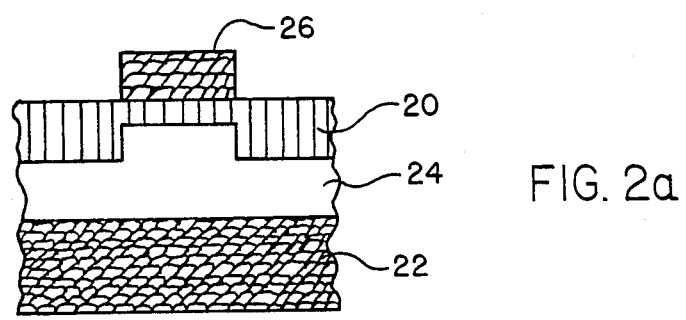
FIG. 2a is a cross-sectional view of a single ridge waveguide apparatus.
Figure 2B:
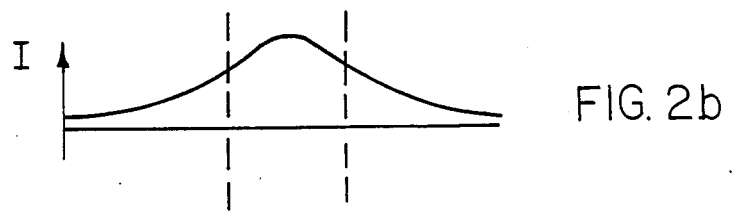

Turning now to FIG. 2a there is shown a cross-sectional view of another embodiment of the dielectric ridge waveguide gas laser apparatus. FIG. 2a shows only one ridged waveguide portion which comprises a single dielectric material 20 with a plurality of ridges formed thereon. While only one ridged waveguide is shown, it is well understood that any desired number or the same number of ridged waveguides as shown in FIG. 1a may be utilized. A metal structure 22 or other electrically conductive material may be utilized to form the lower portion of the waveguide assembly. A metal electrode strip 26 is provided on the top surface of the dielectric material 20. An air gap 24 is formed between the dielectric material 20 and the conductive metal structure 22 and contains the appropriate laser gas mixture. In FIG. 2b there is shown a graphical representation of the near field intensity for the single ridge waveguide gas laser apparatus of FIG. 2a. From this near field intensity representation one can easily appreciate the fact that as spacing "d" is decreased, more coupling occurs between adjacent ridged waveguides and stronger phased locking of adjacent lasers occurs.

Figure 3:
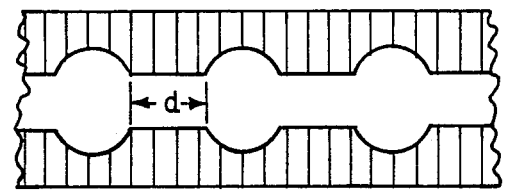
FIG. 3 is a cross-sectional view of multiple ridge waveguides with semi-circular grooves.

If the square corners of the ridge waveguide in either the single or double ridge configuration prove to be a handicap in fabrication or performance, then semicircular grooves may be grounded into the dielectric material as shown in FIG. 3. As indicated above, the semicircular groove approach may be utilized for either of the structures of FIG. 2a or FIG. 1a. The advantage of the structure of FIG. 3 is that the distance "d" between adjacent waveguides can be made very small, i.e., it can approach a needle like point as the two guides are ground down into the dielectric with a round grinding tool. This structure can thus provide maximum coupling between adjacent guides.

Figure 4:
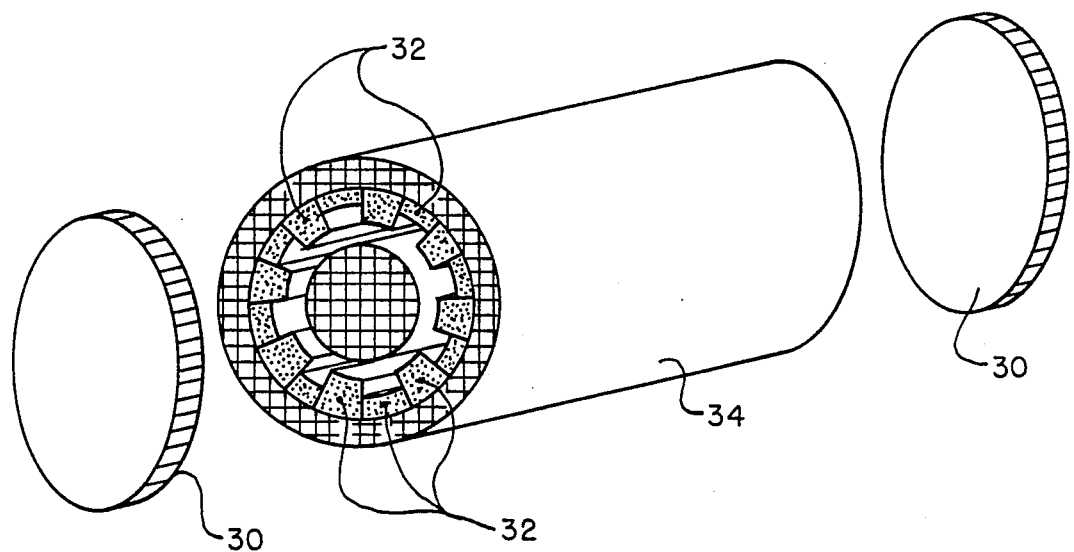
FIG. 4 is a perspective view of multiple ridge waveguides arranged in a cylindrical configuration.

A compact, high power, $CO_2$ waveguide laser apparatus may be fabricated with the cylindrical configuration shown in FIG. 4. This configuration can use common optics for all the individual waveguide lasers which are phase-locked together. Common optics can yield good frequency tracking and frequency stability as a function of temperature between the individual lasers. The mirrors 30 may be attached directly onto the cylindrical dielectric structure or onto another housing containing the cylindrical assembly of multiple ridged waveguides. Strips of dielectric material 32 can be pre-machined and then assembled within the metal cylinder 34 much like a "Roman Arch" i.e., the last piece is inserted and forms a wedge which prevents the circle of wedged thin slab from collapsing. The metal cylinder 34 may be utilized as the ground electrode for RF excitation or any other suitable excitation source. The excitation source may be applied to the conductive center electrode 36 which extends along the longitudinal axis of the cylindrical waveguide.

The dielectric waveguide gas laser configuration can also function with an axial dc discharge down the length of the guide as is well known in the state of the art. The phased locked ridged waveguide laser can also function with d.c. discharges.

The benefits that are usually incurred by the use of gas flow in $CO_2$ lasers transverse to the discharge length of the laser, can also be realized in the waveguide gas laser apparatus of FIGS. 1 and 3. The gas flow, say from left to right, will move energized $CO_2$ and $N_2$ molecules from the minimum gap region into the maximum gap region. Since the optical mode has the largest amplitude in this region, the strongest laser oscillation will occur in this region and rapid depopulation of the excited $CO_2$ lasing species would occur. Since the $N_2$ molecules have long life excited states, they will continue to transfer energy to the $CO_2$ molecules for subsequent lasing in other ridged waveguides downstream of the flow direction. In the interest of gas flow and cooling in the waveguide gas laser apparatus, it would be quite novel and useful to use non-mechanical, blowers, such as piezoelectric bellow blowers. The use of piezoelectric blowers will provide compactness, long life, and ruggedness in the waveguide gas laser apparatus.

Figure 5:
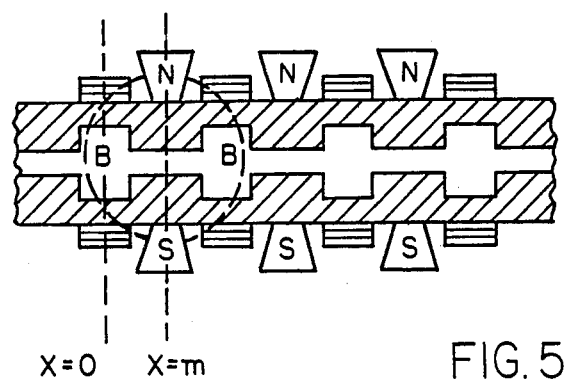
FIG. 5 is a cross-sectional view of multiple ridge waveguides laser apparatus having a fringing magnetic field.
Figure 6:
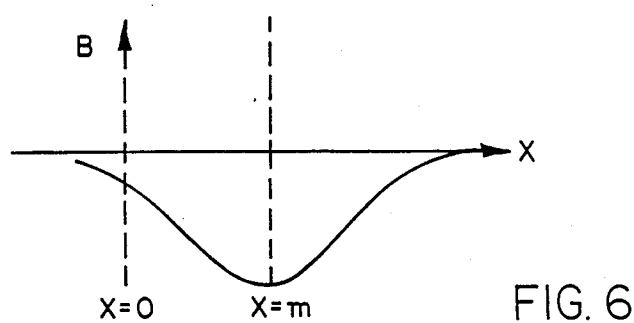
FIG. 6 is a graphical representation of the magnetic field utilized in the apparatus of FIG. 5.
Figure 7:
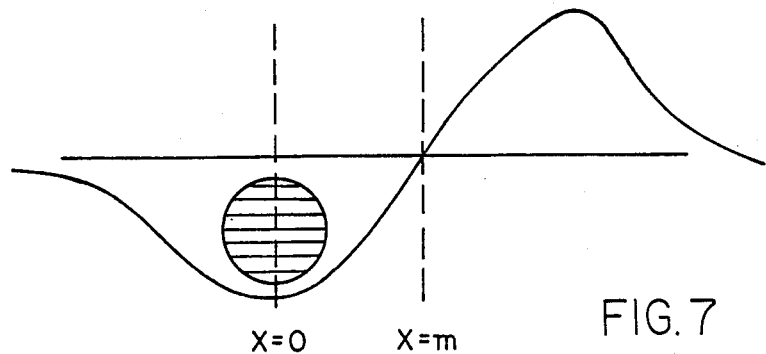
FIG. 7 is a graphical representation of a fringing magnetic field to maintain the discharge in a potential well.

There is shown in FIG. 5 a multiple ridged waveguide apparatus utilizing magnetic material or devices to establish a fringing magnetic field in the maximum gap "c" region. The magnetic field could be used to hold the discharge in the maximum gap region under a gas flow situation, say from left to right. The value of this magnetic field is determined in proportion to operating pressure and gas flow velocity which determines the electron drift velocity in the gas. For the range of pressures and velocities, the fields should be in the area of 200 to 300 gauss which can easily be obtained with either wound electromagnets or with permanent magnets. The force $F_m$ exerted by the magnetic field, B, on the electrons having charge, e, in the discharge is given by the following expression:

$$F_m = ev_d B$$

where, $v_d$ is the drift velocity. Since the center of the magnetic field is placed at X=m (see FIG. 6), a plot of the magnetic field with respect to the center of the waveguide region at X=O resembles (see FIG. 7) the potential "V" of this B field which is given by the following expression:

$$V = \int F_m dx$$

which yields a plot resembling the sketch in FIG. 7

FIG. 7 illustrates that a fringing magnetic field can be placed along the multiple waveguide structure to maintain the discharge in a potential well, which can in turn be positioned to occur at the point where the maximum gap of the dielectric ridge waveguide occurs. Such a technique can be utilized with gas flow to realize the increased power benefits in a waveguide laser as convection cooling has provided to more conventional lasers to date. The technique can also be used with gas flow but used instead to move RF generated discharge from the minimum gap region (where it may tend to form in the configuration of FIG. 1) into the maximum gas region.

Although the invention has been described with reference to a particular embodiment, it will be understood to those skilled in the art that the invention is capable of a variety of alternative embodiments within the spirit and scope of the appended claims.

Figure 8:
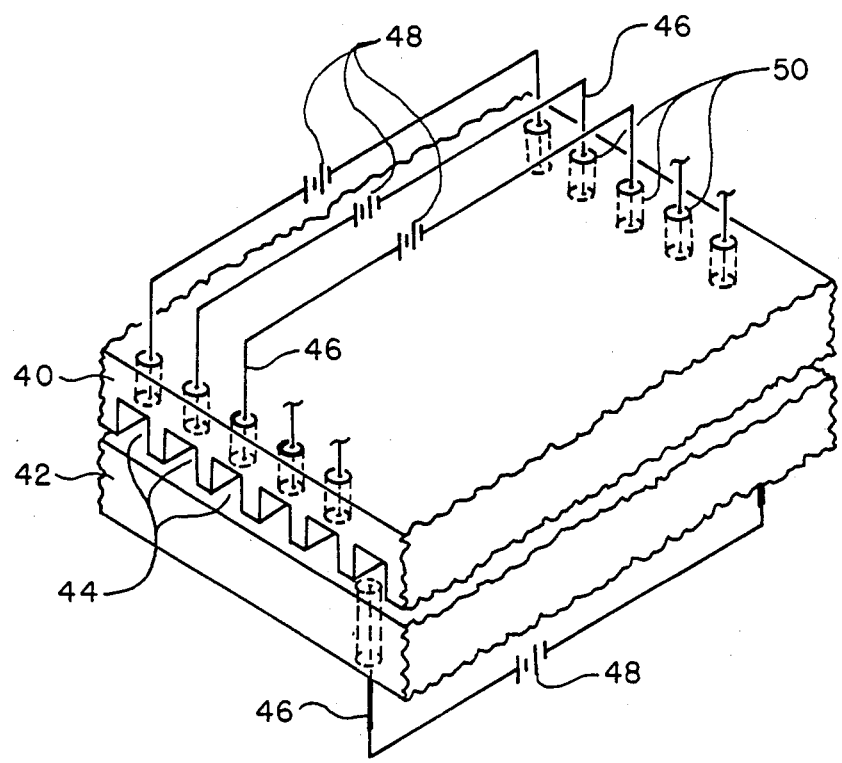
FIG. 8 is a perspective view of a multiple ridge waveguide laser apparatus utilizing dc excitation.

FIG. 8 is a perspective view of a multiple ridge waveguide laser apparatus utilizing a dc excitation. The waveguide laser apparatus comprises first and second dielectric substrates 40, 42. The first dielectric substrate 40 contains longitudinal rectangular grooves or waveguides 44. The grooves 44 may be rectangular or semicircular as described earlier. Pairs of dc electrodes 46 are provided for each waveguide 44. The electrode pairs 46 comprise a first and second electrode which are positioned at opposite ends of its respective waveguide. The electrode pairs may be arranged either in rows across the top of the first dielectric substrate or alternated between the first and second (top and bottom) dielectric substrates between adjacent waveguides or any combination thereof. A dc excitation source 48 such as battery is shown connected between the electrode pairs. The electrode pairs 46 which pass through insulated feedthroughs 50 in the first and second dielectric substrates may be either flush with or protrude slightly into the waveguide channel. For military applications, RF excitation is desired because of smaller size, lower voltage etc. For commercial and industrial applications, dc excitation may be preferred because of lower cost.

What is claimed is:

1. A dielectric ridged waveguide flowing gas laser apparatus comprising in combination:
    a dielectric substrate having a predetermined number of grooves formed thereon, said grooves extending along the longitudinal axis of said dielectric substrate,
    an electrically conductive member in parallel alignment with the grooved side of said dielectric substrate such that an air gap is formed therebetween said air gap containing an active laser gas medium,
    electrically conductive strips disposed on the outside of said dielectric substrate forming electrodes, said conductive strips being aligned with said grooves and having the same length and width as said grooves, and
    an excitation source connected between said conductive member and said conductive strips, to provide lasing in said ridged waveguide.

2. A dielectric ridged waveguide gas laser apparatus as described in claim 1 wherein said grooves are semicircular.

3. A dielectric ridged waveguide gas laser apparatus as described in claim 1 wherein said grooves are rectangular.

4. A dielectric ridged waveguide gas laser apparatus as described in claim 1 wherein said excitation source is an RF generator.

5. A dielectric ridged waveguide flowing gas laser apparatus comprising in combination:
    a first dielectric substrate with a predetermined number of grooves formed therein,
    a second dielectric substrate with a predetermined number of grooves formed therein, said first dielectric substrate and said second dielectric substrate being positioned to form an air gap between their respective grooved surfaces, said grooves of said first dielectric substrate being aligned with said grooves of said second dielectric substrate, said air gap containing an active laser gas medium,
    conductive strips respectively positioned on the outside surfaces of said first dielectric substrate and said second dielectric substrate, said conductive strips respectively aligned with said grooves of said first dielectric substrate and said second dielectric substrate, said conductive strips having the same length and width dimensions as their corresponding grooves, and
    an excitation source connected between corresponding conductive strips that are located on opposite sides of said first dielectric substrate and said second dielectric substrate, said excitation source energizing said conductive strips to produce a discharge in said laser gas medium thereby providing lasing in said ridged waveguide.

6. A dielectric ridged waveguide gas laser apparatus as described in claim 5 wherein said grooves are semicircular.

7. A dielectric ridged waveguide gas laser apparatus as described in claim 5 wherein said grooves are rectangular.

8. A dielectric ridged waveguide gas laser apparatus as described in claim 5 wherein said excitation source is an RF generator.

9. A dielectric ridged waveguide gas laser apparatus as described in claim 8 further including means for creating a magnetic field, said magnetic field means establishing a fringing magnetic field in the maximum gap region between said first and second dielectric substrates.

10. A dielectric ridged waveguide gas laser apparatus as described in claim 9 wherein said magnetic field means comprises a predetermined number of permanent magnets.

11. A dielectric ridged waveguide gas laser apparatus as described in claim 9 wherein said magnetic field means comprises means for an electromagnet.

12. A dielectric ridged waveguide flowing gas laser apparatus comprising in combination:
    a dielectric substrate with a predetermined number of grooves formed therein, said grooves extending along the longitudinal axis of said dielectric substrate,
    a cylindrical member having an inner diameter such that said dielectric substrate conforms to the inner surface of said cylindrical member, said grooves of said dielectric substrate extending along the longitudinal axis of said cylindrical member and radially inward toward the central axis of said cylindrical member, a conductive member centered about and extending along said central axis of said cylindrical member to form an air gap therebetween, said air gap containing an active laser gas medium, and an excitation source connected between said conductive member and said cylindrical member, said cylindrical member being conductive, said excitation source producing a discharge in said laser gas medium thereby providing lasing in said ridged waveguide to generate laser oscillations.

13. A dielectric ridged waveguide gas laser apparatus as described in claim 12 wherein said grooves are semicircular.

14. A dielectric ridged waveguide gas laser apparatus as described in claim 12 wherein said grooves are rectangular.

15. A dielectric ridged waveguide gas laser apparatus as described in claim 12 wherein said excitation source is an RF generator.

16. A dielectric ridged waveguide flowing gas laser apparatus comprising in combination:

a first dielectric substrate with a predetermined number of grooves formed therein, said grooves extending along the longitudinal axis of said first dielectric substrate, a second dielectric substrate in parallel alignment with the grooved side of said first dielectric substrate forming an air gap therebetween, said air gap containing an active laser gap medium, dc electrode pairs, having first and second electrodes which are positioned at opposite ends of corresponding groove, said dc electrode pairs respectively protruding slightly into said grooves, and a dc excitation source connected between said electrode pairs, said dc excitation source produces a discharge in said laser gas medium to provide lasing in said ridged waveguide laser oscillations.

17. A dielectric ridged waveguide gas laser apparatus as described in claim 16 wherein said dc excitation source is a dc battery.

18. A dielectric ridged waveguide gas laser apparatus as described in claim 17 wherein said grooves are semicircular.

19. A dielectric ridged waveguide gas laser apparatus as described in claim 16 wherein said grooves are rectangular.

* * * * *